(12) United States Patent
Fernandes et al.

(10) Patent No.: US 10,949,225 B2
(45) Date of Patent: Mar. 16, 2021

(54) AUTOMATIC DETECTION OF USER INTERFACE ELEMENTS

(71) Applicant: SAP SE, Walldorf (DE)

(72) Inventors: Warren Mark Fernandes, Mumbai (IN); Mohammad Saad Rashid, Delhi (IN); Sai Phani Sharath Chandra Danthalapelli, Warangal (IN); Sonam Saxena, Lucknow (IN); Mithilesh Kumar Singh, Ara (IN)

(73) Assignee: SAP SE, Walldorf (DE)

( * ) Notice: Subject to any disclaimer, the term of this patent is extended or adjusted under 35 U.S.C. 154(b) by 260 days.

(21) Appl. No.: 16/268,755

(22) Filed: Feb. 6, 2019

(65) Prior Publication Data

US 2020/0249964 A1    Aug. 6, 2020

(51) Int. Cl.
*G06F 11/07*     (2006.01)
*G06F 9/451*     (2018.01)
*G06F 11/14*    (2006.01)
*G06N 5/02*      (2006.01)
*G06F 11/36*    (2006.01)

(52) U.S. Cl.
CPC .......... *G06F 9/451* (2018.02); *G06F 11/0793* (2013.01); *G06F 11/1415* (2013.01); *G06N 5/027* (2013.01); *G06F 2201/805* (2013.01)

(58) Field of Classification Search
CPC ............. G06F 11/0793; G06F 11/1415; G06F 2201/805; G06F 11/36; G06F 11/362
USPC ............................................. 714/2, 15, 38.1
See application file for complete search history.

(56) References Cited

U.S. PATENT DOCUMENTS

| 9,389,872 B2* | 7/2016 | Trowbridge .............. G06F 8/38 |
| 2008/0276260 A1* | 11/2008 | Garlick ............... G06F 11/3688 719/328 |
| 2015/0378876 A1* | 12/2015 | Ji ........................ G06F 11/3688 714/38.1 |
| 2017/0337321 A1* | 11/2017 | Hoford ..................... G06F 8/38 |
| 2018/0335922 A1* | 11/2018 | Nilo ..................... G06F 3/04845 |
| 2019/0042397 A1* | 2/2019 | Vignesh .............. G06F 11/3696 |
| 2020/0050540 A1* | 2/2020 | Gao .................... G06F 11/3438 |

\* cited by examiner

*Primary Examiner* — Chae M Ko
(74) *Attorney, Agent, or Firm* — Fish & Richardson P.C.

(57) ABSTRACT

The present disclosure involves systems, software, and computer implemented methods for automatically detecting user interface elements. One example method includes accessing master frame information for a user interface of an application. The master frame information includes first captured user interface information captured during a first execution of a scenario for the application. A subsequent execution of the scenario is performed, including capturing second captured user interface information. A determination is made that the subsequent execution of the scenario has not passed successfully, due to a non-functional error. A determination is made that the non-functional error is based on a failure to locate a user interface element specified in the master frame. A recovery strategy is performed, using the first captured user interface information and the second captured user interface information, to automatically locate the user interface element.

20 Claims, 6 Drawing Sheets

```
# This process flow creates an internal project with the given data    252
Login ${USERNAME} ${PASSWORD}

Navigate https://server.example.corp/ui?client=715&lang=EN#InternalProject-createInternalProject    254

Enter Project ID ${PID}    256

Enter Project Name ${PNAME}    258

Enter Description ${DESC}    260

Click Button Save    262
```

US 10,949,225 B2

AUTOMATIC DETECTION OF USER INTERFACE ELEMENTS

TECHNICAL FIELD

The present disclosure relates to computer-implemented methods, software, and systems for automatically detecting user interface elements.

BACKGROUND

A testing team can develop a test plan for testing an application. The test plan can identify scenarios of using the application with particular inputs. The inputs can include valid inputs and invalid inputs, from a perspective of the application. The test plan can define expected outputs for the defined inputs. Execution of the test plan can include performing the scenarios, gathering actual application outputs, and comparing the actual application outputs to the expected outputs.

SUMMARY

The present disclosure involves systems, software, and computer implemented methods for automatically detecting user interface elements. One example method includes accessing master frame information for a user interface of an application. The master frame information includes first captured user interface information captured during a first execution of a scenario for the application. A subsequent execution of the scenario is performed, including capturing second captured user interface information. A determination is made that the subsequent execution of the scenario has not passed successfully, due to a non-functional error. A determination is made that the non-functional error is based on a failure to locate a user interface element specified in the master frame. A recovery strategy is performed, using the first captured user interface information and the second captured user interface information, to automatically locate the user interface element.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
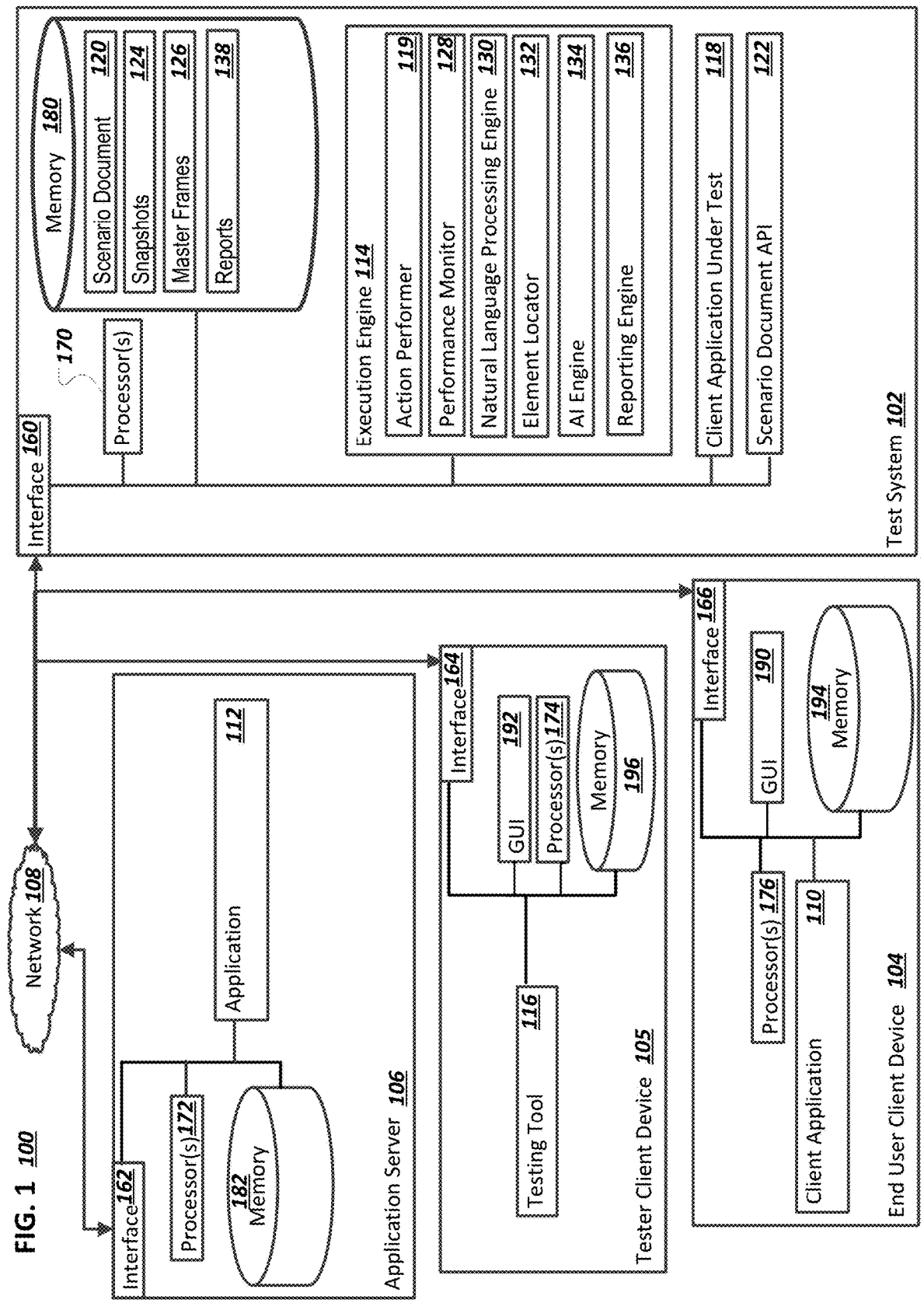
FIG. 1 is a block diagram illustrating an example system for automatically detecting user interface elements.

Different types of computer applications can include features of locating and identifying user interface elements on a user interface. For example, an automated testing application can locate a particular user interface element and programmatically interact with the element (e.g., to select (e.g., "click") the element). Different types of issues, problems, or challenges can arise related to automatic user interface identification and location. For instance, if a computer application, such as an automated testing application, relies on marker attributes, such as element identifiers, to remain constant, the computer application may fail to correctly identify or locate a user interface element when marker attributes change.

As another example, an automated testing application can execute tests that have been defined for automation. Manual creation and updating of an automated test can require substantial tester time. For instance, an automated test may need to be manually updated when a scenario document or an application interface changes. If a scenario document is maintained separate from automated test definitions, additional resource consumption (e.g., tester or analyst time) and update cycle delays may be required to coordinate updates to both the scenario document and the automated test(s). A high degree of maintenance and coordination can pose problems for scalability when large computer systems are considered or planned for development. As another example, use interface element identifiers can, for some systems, be generated at build time, so that each time a build occurs, identifiers can change. Accordingly, manually updating test scripts with new identifiers can be a tedious, error-prone process.

An AI (Artificial Intelligence) test execution framework can be deployed to solve the maintenance, overhead, and test update issues described above. The test execution framework can enable process automation and testing of various types of user interface frameworks, including for applications that have complex processes and dynamic user interfaces.

A scenario document can be written using an intermediate language that is in a human-readable format. The scenario document can describe what needs to be tested in a contextual rather than an abstract way. As described below, a scenario document can enable test-driven development. The test execution framework can parse and analyze the scenario document directly, rather than accessing an automated test that is separate from the scenario document. A scenario document can enable consistent execution of an application under test. Since a scenario document acts as the input for the automation framework, tests can be inherently consistent with previous tests.

The test execution framework can use the scenario document input to automatically locate and interact with user interface elements. The test execution framework can store an initial set of DOM (Document Object Model) data, for example, and use the initial set of DOM data, and subsequent DOM data, to locate user interface elements that may have moved or changed within the subsequent DOM. The test execution framework can find and interact with user interface elements, even if user interface element identifiers have changed (e.g., due to a new build), or if minor, technical, non-functional changes have been made to a user interface. Accordingly, a large reduction in manual modification of test documents or scripts can occur.

Automatic user interface element locating can enable greater control over application upgrade cycles by ensuring that application test automations work across releases for user interfaces that have not had functional changes. The ability to locate UI (User Interface) components effectively in dynamic environments can enable stable execution of workflows. Accordingly, the test execution framework can be used to automate a large amount of manual work. A greater return on investment for testing resources can be achieved since testers can focus on creating tests for functional changes, rather than performing mundane maintenance work. Overall quality assurance expenditures can be reduced. Less full-time software testers may need to be employed, for example. Remaining software testers can have better job satisfaction, due to less mundane, rote work. Other type of personnel can achieve benefits—for example, developers may receive less issue tickets due to less test failures, particularly less test failures of a non-functional nature.

FIG. 1 is a block diagram illustrating an example system 100 for automatically detecting user interface elements. Specifically, the illustrated system 100 includes or is communicably coupled with a test system 102, an end user client device 104, a tester client device 105, an application server 106, and a network 108. Although shown separately, in some implementations, functionality of two or more systems or servers may be provided by a single system or server. In some implementations, the functionality of one illustrated system or server may be provided by multiple systems or servers.

An end user can use an end-user client device 104 to use a client application 110 that is a client version of a server application 112 hosted by the application server 106. In some instances, the client application 110 may be any client-side application that can access and interact with at least a portion of the illustrated data, including a web browser, a specific app (e.g., a mobile app), or another suitable application. Before an initial or subsequent versions of the client application 110 are deployed, a testing team can test the client application 110 and the server application 112.

For instance, a test system 102 can include an execution engine 114 which can be used to test applications such as the client application 112. A tester can use a testing tool 116 on the tester client device 105 to interface with the execution engine 114, e.g., to initiate tests and view test results.

The execution engine 114 can be configured to perform automated tests. For instance, the execution engine 114 can be configured to programmatically load a client application 118 corresponding to the client application 110, automatically interact with user interface elements of the client application 118 (using an action performer 119), provide test data to the client application 118, and collect outputs from the client application 118.

An automated test can be driven by a scenario document 120, which can describe, at a conceptual level, user interface elements, actions to perform, and data to be provided for a given scenario for the client application 118. The execution engine 114 can be configured to use a scenario document API (Application Programming Interface) 122 to receive information from the scenario document as input data.

The execution engine 114 can be configured to perform an initial "first run" process to generate information used for subsequent "second run" processes. During the first run, the execution engine 114 can use information from the scenario document 120 to generate snapshots 124 that include captured UI (User Interface) properties, including properties and coordinates of user interface elements. Master frames 126 are a hybrid data structure that maps information in the scenario document 120 to information in the snapshots 124.

The master frames 126 can be used by the execution engine in the second run process. During the second run, the action performer 119 can perform actions specified in the master frames 126, and determine whether those actions have been performed successfully. If any action is not performed successfully, the execution engine 114 can determine a cause of failure. For instance, a cause of failure may be due to a functional change in an application that causes an older test to fail. A scenario document may need to be updated and test(s) rerun after the scenario document has been updated. As another example, a performance monitor 128 can determine a performance failure (e.g., an application failing to load).

As yet another example, the execution engine 114 can identify an assertion failure. In some implementations, a natural language processing engine 130 is used to determine if an actual value that failed an assertion check is semantically the same as an expected value used in the check. If the actual value is semantically the same as the assertion value, the execution engine can report the difference and can also automatically adjust the scenario document 120 (e.g., using the scenario document API 120) so that future assertion checks pass when the semantically equivalent values are compared to one another.

An element locator 132 can locate user interface elements specified in the scenario document information, so that the action performer 119 can perform defined action(s) on the located user interface elements. As mentioned, identifier and other user interface element properties may change between builds or releases. The element locator 132 can be configured to locate user interface elements even when such changes occur. For instance, a DOM may change between builds or releases of an application. The element locator 132 can use various approaches for finding elements when DOM or other UI definition changes occur. For instance, tree-localization, multiple-attribute, or visual-positioning approaches can be used. These approaches are described in more detail below. An AI engine 134 can learn, over time, which approach to use in certain situations. For instance, some approaches may be faster and some may be more reliable.

When the element locator 132 successfully finds a user interface element, including ones that were not initially located, the action performer 119 can perform any defined actions on the located element. The execution engine 114 can use information determined by the element locator 132 during element locating to repair the master frames 126 so that the elements are found more quickly (e.g., immediately) in subsequent second-run executions.

A reporting engine 136 can create various types of reports 138. The reports 138 can include first-run and second-run reports. Test results, including pass/failure of first and second runs can be logged. Test outputs can include automatically classified issues (e.g., functional, non-functional, performance, DOM change, assertion failure). Automatic issue classification can improve issue tracking and reporting. User experience reports can include metrics that help development teams to improve customer experience. Outputs from first and second runs can be logged to track and analyze functional and UI changes across product lifecycles. In some implementations, application documentation is automatically generated from the scenario description document 120.

As used in the present disclosure, the term "computer" is intended to encompass any suitable processing device. For example, although FIG. 1 illustrates a single test system 102, a single end-user client device 104, a single tester client device 105, and a single application server 106, the system 100 can be implemented using a single, stand-alone computing device, two or more test systems 102, two or more application servers 106, two or more end-user client devices 104, two or more tester client devices 105, etc. Indeed, the test system 102, the application server 106, the tester client device 105, and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the test system 102, the application server 106, the tester client device 105, and the end-user client device 104 may be adapted to execute any operating system, including Linux, UNIX, Windows, Mac OS®, Java™, Android™, iOS or any other suitable operating system. According to one implementation, the application server 106 and/or the test system 102 may also include or be communicably coupled with an e-mail server, a Web server, a caching server, a streaming data server, and/or other suitable server.

Interfaces 160, 162, 164, and 166 are used by the test system 102, the application server 106, the tester client device 105, and the end-user client device 104, respectively, for communicating with other systems in a distributed environment—including within the system 100—connected to the network 108. Generally, the interfaces 160, 162, 164, and 166 each comprise logic encoded in software and/or hardware in a suitable combination and operable to communicate with the network 108. More specifically, the interfaces 160, 162, 164, and 166 may each comprise software supporting one or more communication protocols associated with communications such that the network 108 or interface's hardware is operable to communicate physical signals within and outside of the illustrated system 100.

The test system 102, the application server 106, the tester client device 105, and the end-user client device 104, each respectively include one or more processors 170, 172, 174, or 176. Each processor in the processors 170, 172, 174, and 176 may be a central processing unit (CPU), a blade, an application specific integrated circuit (ASIC), a field-programmable gate array (FPGA), or another suitable component. Generally, each processor in the processors 170, 172, 174, and 176 executes instructions and manipulates data to perform the operations of a respective computing device.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The test system 102 and the application server 106 respectively include memory 180 or memory 182. In some implementations, the test system 102 and/or the application server 106 include multiple memories. The memory 180 and the memory 182 may each include any type of memory or database module and may take the form of volatile and/or non-volatile memory including, without limitation, magnetic media, optical media, random access memory (RAM), read-only memory (ROM), removable media, or any other suitable local or remote memory component. Each of the memory 180 and the memory 182 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the respective computing device.

The end-user client device 104 and the tester client device 105 may each be any computing device operable to connect to or communicate in the network 108 using a wireline or wireless connection. In general, each of the end-user client device 104 and the tester client device 105 comprises an electronic computer device operable to receive, transmit, process, and store any appropriate data associated with the system 100 of FIG. 1. Each of the end-user client device 104 and the tester client device 105 can include one or more client applications, including the client application 110 or the testing tool 116, respectively. A client application is any type of application that allows a client device to request and view content on the client device. In some implementations, a client application can use parameters, metadata, and other information received at launch to access a particular set of data from the test system 102 or the application server 106. In some instances, a client application may be an agent or client-side version of the one or more enterprise applications running on an enterprise server (not shown).

Each of the end-user client device 104 and the tester client device 105 is generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the tester client device 105 may comprise a computer that includes an input device, such as a keypad, touch screen, or other device that can accept user information, and an output device that conveys information associated with the operation of the test system 102 or the application server 106, or the client device itself, including digital data, visual information, or a graphical user interface (GUI) 190 or 192, respectively.

The GUI 190 and the GUI 192 each interface with at least a portion of the system 100 for any suitable purpose, including generating a visual representation of the client application 110 or the testing tool 116, respectively. In particular, the GUI 190 and the GUI 192 may each be used to view and navigate various Web pages. Generally, the GUI 190 and the GUI 192 each provide the user with an efficient and user-friendly presentation of business data provided by or communicated within the system. The GUI 190 and the GUI 192 may each comprise a plurality of customizable frames or views having interactive fields, pull-down lists, and buttons operated by the user. The GUI 190 and the GUI 192 each contemplate any suitable graphical user interface, such as a combination of a generic web browser, intelligent engine, and command line interface (CLI) that processes information and efficiently presents the results to the user visually.

Memory 194 and memory 196 respectively included in the end-user client device 104 or the tester client device 105 may each include any memory or database module and may take the form of volatile or non-volatile memory including, without limitation, magnetic media, optical media, random access memory (RAM), read-only memory (ROM), removable media, or any other suitable local or remote memory component. The memory 194 and the memory 196 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of end-user client devices 104 and tester client devices 105 associated with, or external to, the system 100. Additionally, there may also be one or more additional client devices external to the illustrated portion of system 100 that are capable of interacting with the system 100 via the network 108. Further, the term "client," "client device," and "user" may be used interchangeably as appropriate without departing from the scope of this disclosure. Moreover, while client device may be described in terms of being used by a single user, this disclosure contemplates that many users may use one computer, or that one user may use multiple computers.

Figures 2A, 2B:
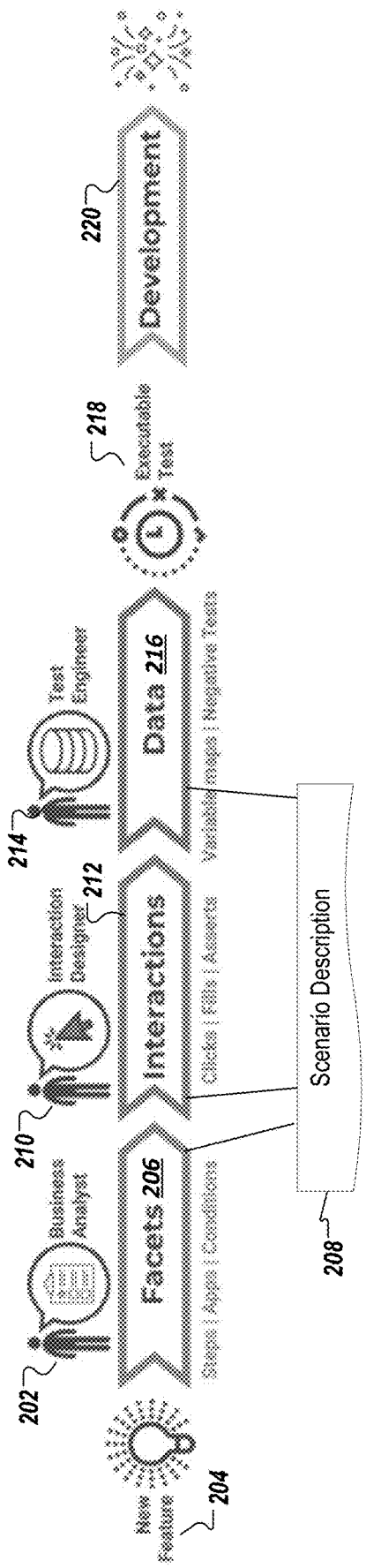
FIG. 2A illustrates an example system for application development using a scenario description document.
FIG. 2B illustrates an example of a scenario description document.

FIG. 2A illustrates an example system 200 for application development using a scenario description document. A business analyst 202 can identify a new feature 204 to be implemented in a computer system. The business analyst 202 can determine facets 206 for the new feature 204, including which application (e.g., either new or existing) can be used to incorporate the new feature 204, what high-level steps are to be involved, and what business conditions are to be fulfilled by the new feature 204. The business analyst 202 can document the facets 206 in a scenario description document 208. The scenario description document 208 can be written using a human-readable intermediate language.

An interaction designer 210 can expand the scenario description document 208 to include descriptions of user interface(s) that may be used for the new feature 204. For instance, the interaction designer 210 can include, in the scenario description document 208, descriptions of interactions 212, such as actions (e.g., clicks, data/field fill-ins), and assertions that an application may perform on entered data, for example.

A test engineer 214 can further expand the scenario description document 208 to include test data considerations 216, such as variable mapping, negative test data, etc. For instance, the test engineer 214 can include descriptions of different sets of test data for different countries, different languages, etc. Negative test data can include data that is invalid from an application perspective, for use in negative tests to determine whether the application gracefully handles the invalid data.

The scenario description document 208 can be used to create an executable test 218. For example, a test engine can use the scenario description document 208, with test data, to test application(s) that have been developed to implement the new feature 204. The executable test 218 can be part of a test-driven development approach, in that the executable test 218 can be created before a development phase 220 occurs. The development phase 220 can be marked as completed, for example, when a developed application passes conditions specified in the executable test 218. As another example, a user interface may be developed, in the development phase 220, and the executable test 218 can be generated to test the already developed user interface.

FIG. 2B illustrates an example of a scenario description document 250. The scenario documented in the scenario description document 250 includes statements, in a human-readable intermediate language, including a reference to a login sub-scenario 252. Sub-scenarios can be used to modularize scenario descriptions, such as to reuse common sub-scenarios (e.g., multiple scenarios may refer to the login sub-scenario).

The scenario includes a navigate action 254 that instructs a testing tool or other application to navigate to a particular resource using a specified URL (Uniform Resource Locator), for example. The specified URL can included parameters. The scenario includes action statements 256, 258, and 260 of entering a project identifier, a project name, and a project description, respectively. The scenario includes a click action 262 for clicking a save button to save the entered project information.

An executable test can be generated using the scenario description document 250, by providing data for USERNAME and PASSWORD parameters for the login sub-scenario 252 and for PID, PNAME, and DESC parameters for the action statements 246, 258, and 260, respectively. Execution of the executable test can include a test engine locating project, project name, and description entry fields in a user interface being tested, filling the found fields with data values for the PID, PNAME, and DESC parameters, respectively, and finding and automatically selecting a save button associated with the click action 262.

Figure 3:
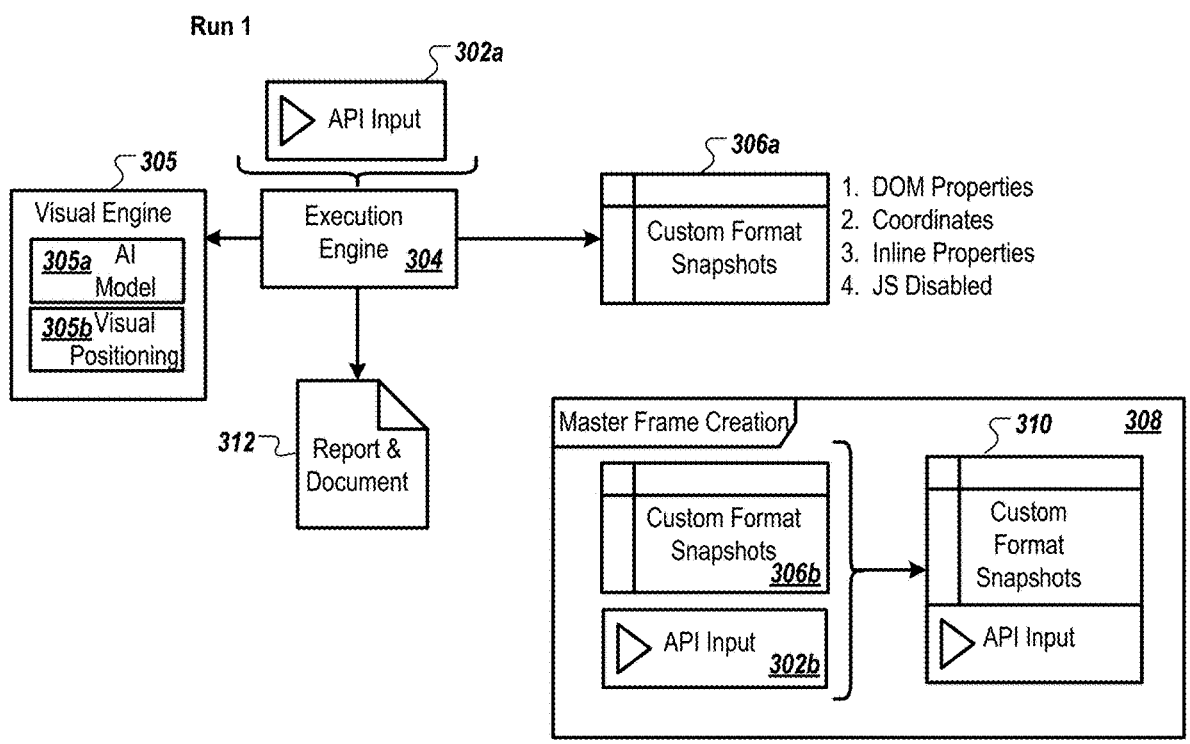
FIG. 3 illustrates a first-run process for enabling automatic detection of a user interface element.

FIG. 3 illustrates a first-run process 300 for enabling automatic detection of a user interface element. Application Programming Interface) input(s) 302a are received by an execution engine 304. The API input(s) 302a can correspond to information specified in the intermediate language in a scenario description document. The execution engine 304 can use an API to retrieve information (as the API input(s) 302a) from the scenario description document. As another example, the API input(s) 302a can be provided to the execution engine 304 by a service that provides scenario document information. The execution engine 304 can be, for example, a testing engine.

The API input(s) 302a can direct the execution engine 304 to locate user interface element(s) on a particular user interface and to perform specified action(s) on the located user interface element(s). The execution engine 304 can use a visual engine 305 to locate user interface elements on the user interface. The visual engine 305 can use an AI model 305a to locate user interface elements, for example. During the first-run process, the execution engine 304 can create, based on the API input(s) 302a, custom format snapshots 306a. The custom format snapshots 306a is a data structure that is created during a successful execution of the first-run process that includes various UI properties that are captured by the execution engine 304, of user interface elements that have been found by the visual engine 305. For instance, a visual positioning component 305b can determine and store coordinates, screen image snapshots, etc.

The custom format snapshots 306a can include information that the execution engine 304 records or generates when displaying a user interface (e.g., web page) referenced in the API input(s) 302a and when performing (e.g., as automated tests/executions) actions defined by the API input(s) 302a. For instance, the custom format snapshots 306a can include DOM (Document Object Model) properties of user interface elements, coordinates of user interface elements, inline properties of user interface elements and/or the web page, and other settings, such as whether scripting languages (e.g., JavaScript) were disabled when the page was loaded. The custom format snapshots 306a can include information, in a DOM or other user interface definition, in and around located user interface elements in the DOM, where located user interface elements are positioned in the DOM tree, relative position to other user interface elements, etc.

The captured coordinates of the user interface elements can be further processed using a resolution manager to generate relative coordinates which can be used to map the captured coordinates for any screen size or resolution (e.g., for later executions of a test for other screen sizes or device types). The custom format snapshots can be stored in various types of formats. One example format is XML (eXtensible Markup Language)/JSON (JavaScript Object Notation).

The execution engine 304 can create a master frame 308. The master frame 308 is a master data structure that includes a mapping 310 that maps generated custom format snapshots to API input(s) with which the custom format snapshots were generated. For instance, the mapping 310 maps custom format snapshots 306b (corresponding to the custom format snapshots 306a) to API input(s) 302b (corresponding to the API input(s) 302a). The master frame 308 can represent a hybrid data model of instructions that maps the API input(s) 302b to unique user interface element information in the custom format snapshots 306b.

If the generation of the custom format snapshots 306a and the master frame 308 is successful, the master frame 308 can be used in a second-run process, as described below, for identification of user interface elements using various approaches. The information obtained by the first-run process can be used in the second-run process to automatically locate user interface elements in later (e.g., second) test runs if those user interface elements are initially not successfully located in the second run. As mentioned, a minor non-functional change may have occurred for the user interface element between test runs (e.g., color, style, or identifier change). Using information obtained during the first run, the second run can complete successfully by automatically locating user interface elements even if those elements had minor non-functional changes.

Successful and unsuccessful first-run process executions can be tracked, and a first-run report 312 can be generated, for viewing by an administrator, for example. The first-run report 312 can include a general status, which can represent an overall pass/fail status that indicates whether test actions were performed successfully. The first-run report 312 can include UI screenshots and logs that include generated master frame information, for example. As another example, the first-run report 312 can include performance insights such as page load time, hardware (processor, memory) profiles or usage. As yet another example, the first-run report 312 can include accessibility information that has been determined by the execution engine 304 when executing the test, including an analysis of general accessibility of the user interface and/or improvement suggestions for the user interface. In some implementations, the first-run report 312 can include best practice information or documentation (e.g., for test-case or UI creation), referenced and/or described by captured snapshots.

Figure 4:
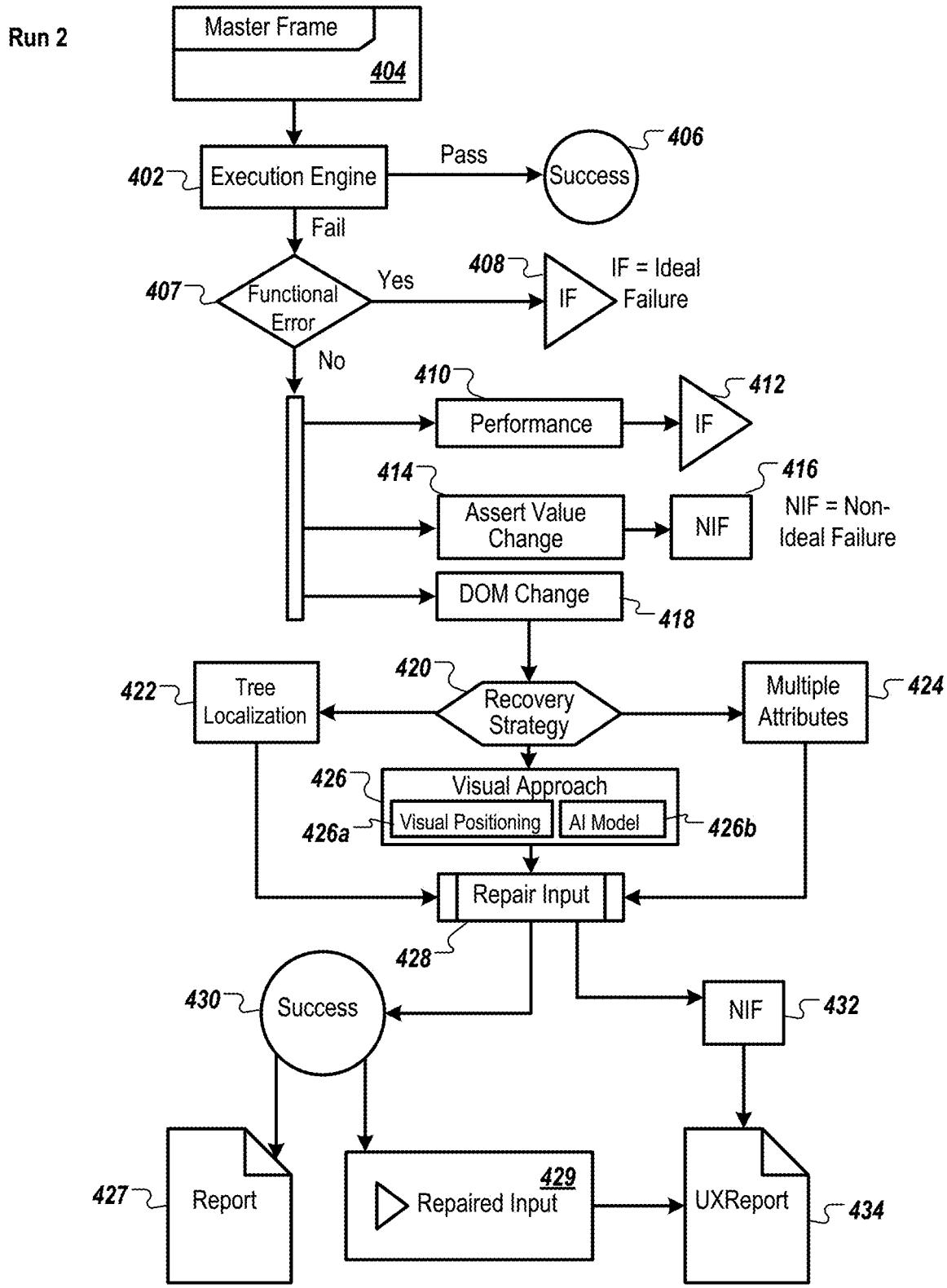
FIG. 4 illustrates a second-run process for automatic detection of a user interface element.

FIG. 4 illustrates a second-run process for automatic detection of a user interface element. The second-run process can be performed to test a particular user interface that has been developed. The second-run process can be a regression test, for example. An execution engine 402 can receive a master frame 404 (e.g., the master frame 404 can be an output of the first-run process described above).

The execution engine 402 can execute a test, including performing operations/actions that are described in information included in the master frame 404. The execution engine 402 can determine whether the test has passed or has failed. If the test has passed, the second-run process can end with a success status 406. The test can fail, for example, if a particular user interface element that the execution engine 402 is attempting to interact with can't be found by the execution engine 402.

If the test has failed, the execution engine 402 can determine (e.g., at 407) whether a failure is a functional error. A functional error can occur, for example, if an application under test has new or changed functionality that a current test is not equipped to handle. For example, if a modified user interface no longer has a particular user interface element, due to modified functionality of the user interface, an existing test that still references the removed user interface element may correctly fail, and such a failure can be reported. If the test has failed due to a functional error, the second-run process can end with an ideal failure status 408. When the second-run process ends with the ideal failure status 408 due to a functional error, the execution engine 402 can generate a report that includes suggestions to adapt a test script to account for the new functionality (e.g., to remove references to removed user interface element(s)).

If the test has not failed due to a functional error, the execution engine 402 can determine whether the test failed for another type of reason. For example, the execution engine 402 can determine that the test has failed due to a performance error 410 (e.g., a page may not have loaded within a predetermined amount of time). In response to determining that the test has failed due to the performance error 410, the second-run process can end with an ideal failure status 412. The ideal failure status 412 can be included in a report. An administrator can, for example, research why the performance issue occurred, and re-attempt the second-run process at a later time, to see if the performance issue is still present.

As another example, the execution engine 402 can determine that the test has failed due to an assert value change 414. An assert value can be an expected value that is compared to an actual value generated during the test. An assert value failure can occur when the expected value does not match the actual value. The execution engine 402 can use natural language processing to determine whether a meaning of the actual value matches the expected value. For instance an actual output value of "PO 877677 Created Successfully" may semantically match an expected value of "PO 877677 Created". In response to determining that the test has failed due to the assert value change 414, the second-run process can end with a non-ideal failure status 416. The non-ideal failure status 416 can be included in a report, along with an actual value, an expected value, an indication of whether the actual and expected values semantically match, and suggestion(s) for changing an application so that the actual and expected values exactly match or changing a test script so that an assert failure no longer occurs (e.g., due to an existing semantic match). In some implementations, a test script is automatically changed so that an assertion checks a subsequent actual value to the actual value rather than the old expected value (or checks to see if the subsequent actual value is either the actual value or the old expected value).

As yet another example, the execution engine 402 can determine that the test has failed due to a DOM change 418. The execution engine 402 can determine that the test has failed due to the DOM change 418, for example, if an attempt to access a particular user interface element results in an error due to the user interface not being found. For instance, in some environments, user interface element identifiers can change between builds, even if there are no substantial changes to a user interface element's function or appearance. As another example, minor changes may occur to a user interface element's appearance or position, without a change to a functioning of the user interface element.

In response to determining that the test has failed due to the DOM change 418, the execution engine 402 can identify and perform at least one recovery strategy 420, e.g., to find the user interface element in a new location in the DOM. Example recovery strategies include a tree localization strategy 422, a multiple-attributes strategy 424, and a visual approach 426. The execution engine 402 can include an AI component that can determine which strategy may be most effective or appropriate to attempt (or attempt first). The AI component can learn, over time, which strategies have better reliability and/or have faster execution. For instance, an order of execution speed, from fastest to slowest, can be determined to be, by the AI component, the tree localization strategy 422, the multiple attributes strategy 424, and the visual approach 426. As another example, an order of reliability, from most reliable to least reliable, can be determined to be, by the AI component, the visual approach 426, the multiple attributes strategy 424, and the tree localization strategy 422.

The tree localization strategy 422 can involve locating a user interface element in the newly generated DOM at a same position in the DOM tree as that of an element in the master frame. Even though the located user interface element may have a different identifier, since it is at a same, or similar position, it may be determined to be a desired (or searched for) element. More particularly, the tree localization strategy 422 can include using a previously stored sub-DOM for a user interface element to find the user interface element in the new DOM associated with the test. A previously stored DOM and the new DOM can be traversed in parallel starting from respective root nodes until a point of divergence between the previously stored DOM and the new DOM is determined. A sub-tree of the new DOM, starting at the determined point of divergence, can be searched to find candidate matches of user interface elements located in the sub-tree that match the user interface element that the test script was trying to access.

The multiple-attributes strategy 424 can involve determining candidate matching elements in the new DOM that match a combination of one or more non-identifier attributes of the user interface element in the master frame. For instance, although an identifier of the user interface element may have changed (which may have cause the test script to not initially locate the element), other attribute values of the element may match corresponding attribute values of candidate user interface elements in the new DOM. A matching score can be calculated for each candidate user interface element that indicates a degree of match between the candidate user interface element in the new DOM with the user interface element in the master frame. If a candidate user interface element in the new DOM has a matching score that is more than a threshold, the execution engine 402 can identify the candidate user interface element as a located user interface element for the test.

The visual approach 426 can include a visual positioning strategy 426a that can include attempting to locate the user interface element based on a previously-recorded visual position. For instance, a stored snapshot may indicate that the user interface element is at a particular relative visual position among user interface elements in the user interface (e.g., the user interface element may have been in a fifth vertical position on the user interface). The execution engine 402 can identify a candidate user interface element in the new DOM that is in a same relative position. As another example, the visual approach 426 can include using an AI model 426b to locate user a user interface element, as described above for the AI model 305a.

In some implementations, strategy approaches can be combined. For instance, the execution engine 402 can determine a likelihood that the candidate user interface element that is in a same visual position as detected previously is a desired user interface element based in part by comparing attribute values of the candidate user interface element to attribute values of the user interface element in a stored version of the DOM. User interface elements of applications that have multiple versions, for different screen resolutions or device types, can be automatically identified based on relative coordinate information stored in the master frame 404.

In general, strategy outcomes for positive location of a user interface element can be selected based on confidence levels. If a confidence level is more than a threshold, the execution engine 402 can determine to positively identify a candidate user interface element as a searched—for element. In some implementations, confidence levels and criteria used in user interface element selection are included in reports, such as a report 427.

Each of the tree localization strategy 422, the multiple attributes strategy 424, and the visual positioning strategy 426 can include a common step of repairing input 428 that can be performed if the user interface element is located. The repairing input 428 step can include modifying the master frame 404 with repaired input 429 so that future executions of the second run may result in the success status 406 due to user interface elements being successfully found when the test is run. A success status 430 can be returned after actions are successfully performed on the element that has been successfully located using a recovery strategy 420. The report 427 can document which repair strategy was performed, and what information was used to locate the user interface element.

If recovery strategy 420 attempts do not result in successful location of the user interface element, a non-ideal failure status 432 can be generated and returned, for the second-run process. A user experience (UX) report 434 can be generated and provided to an administrator, documenting potential reasons for the non-ideal failure status 432. For instance, a new type of user interface may have appeared in the user interface but for reasons other than a functional change. The user interface element may not have been trained, for example. A new, unexpected type of user interface element may cause a negative experience for the end user and can result in negative points in the user experience report 434. As another example, a user interface element may not have been found using recovery strategies due to a drastic change in position. Such a drastic position change can also result in a negative user experience, and corresponding documentation describing the negative experience can be included in the user experience report 434. In some implementations, information regarding the repaired input 429 is included in the user experience report 434.

Figure 5:
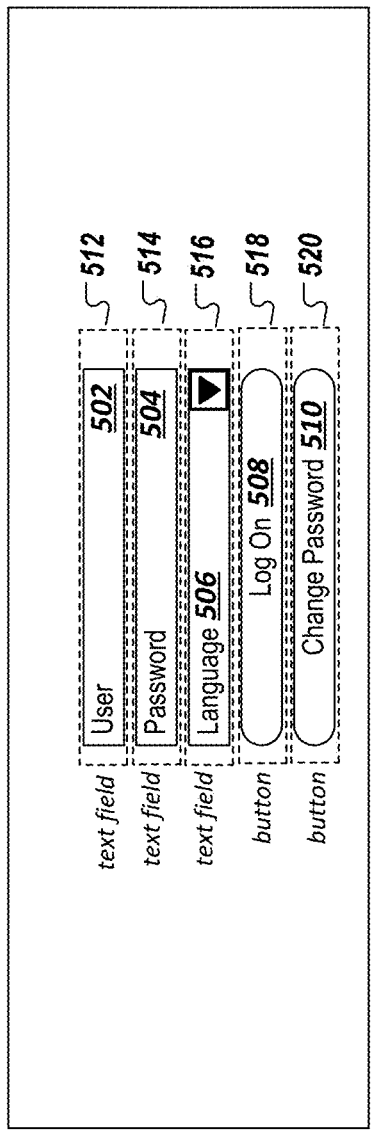
FIG. 5 illustrates an example user interface with user interface elements that have been automatically identified.

FIG. 5 illustrates an example user interface 500 with user interface elements that have been automatically identified. The user interface 500 includes a user identifier text field 502, a password text field 504, a language text field (dropdown) 506, a log-on button 508, and a change-password button 510. An application (e.g., execution engine) has automatically identified the elements on the user interface, as illustrated by located element indicators 512-516.

Once the user interface elements have been automatically located and identified, the application can programmatically interact with the identified elements. As described above, some or all of the user interface elements may have changed attributes (identifiers, other attributes) from a previous version of the user interface 500. The application can be configured to successfully identify the user interface elements, despite these changes, using the strategies discussed above. In some implementations, a snapshot of the user interface, with or without the located element identifiers 512-516, is stored, for logging and reporting purposes. The located element identifiers 512-516 can be rendered on top of the located user interface elements, as shown, in some implementations. In other implementations, the located element identifiers 512-516 are not actually rendered on the user interface 500, but serve, in this example, as abstract illustrations that indicate that indeed the user interface elements were automatically and successfully located by the application.

Figure 6:
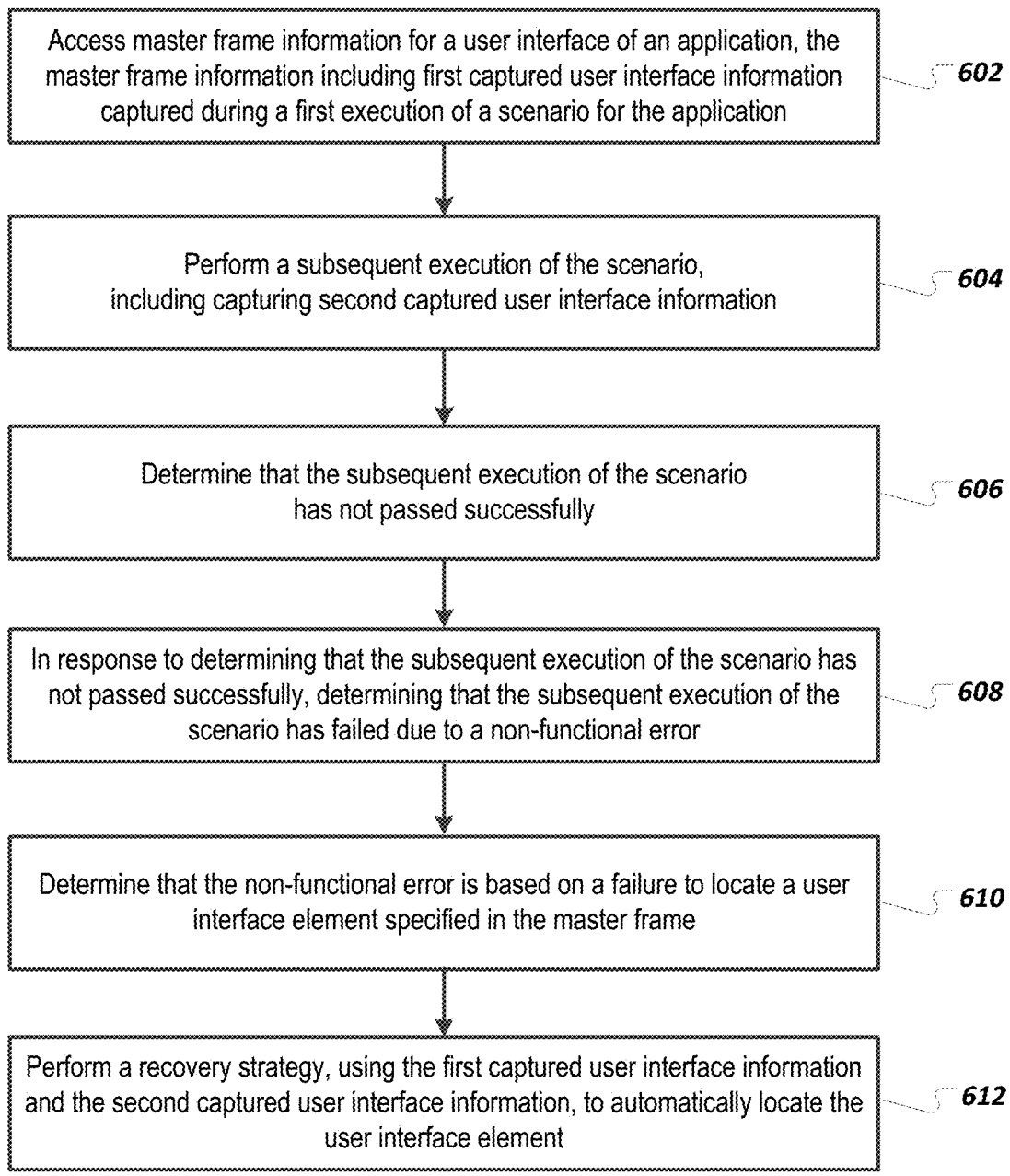
FIG. 6 is a flowchart of an example method for automatically detecting user interface elements.

FIG. 6 is a flowchart of an example method 600 for automatically detecting user interface elements. It will be understood that method 600 and related methods may be performed, for example, by any suitable system, environment, software, and hardware, or a combination of systems, environments, software, and hardware, as appropriate. For example, one or more of a client, a server, or other computing device can be used to execute method 600 and related methods and obtain any data from the memory of a client, the server, or the other computing device. In some implementations, the method 600 and related methods are executed by one or more components of the system 100 described above with respect to FIG. 1. For example, the method 600 and related methods can be executed by the test system 102 of FIG. 1.

At 602, master frame information for a user interface of an application is accessed. The master frame information includes first captured user interface information captured during a first execution of a scenario for the application. The scenario can be defined in a scenario description document written in a human-readable language. The master frame can map user interface elements and associated actions in the scenario description document to the first captured user interface information. The first captured user interface information can include document object model properties and screen coordinates of user interface elements of the application.

At 604, a subsequent execution of the scenario is performed, including capturing second captured user interface information.

At 606, a determination is made that the subsequent execution of the scenario has not passed successfully.

At 608, in response to determining that the subsequent execution of the scenario has not passed successfully, a determination is made that the subsequent execution of the scenario has failed due to a non-functional error.

At 610, a determination is made that the non-functional error is based on a failure to locate a user interface element specified in the master frame.

At 612, a recovery strategy is performed using the first captured user interface information and the second captured user interface information, to automatically locate the user interface element. An action can be performed on the located user interface element. The master frame can be updated based on the second captured user interface information.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
accessing master frame information for a user interface of an application, the master frame information including first captured user interface information captured during a first execution of a scenario for the application;
performing a subsequent execution of the scenario, including capturing second captured user interface information;
determining that the subsequent execution of the scenario has not passed successfully;
in response to determining that the subsequent execution of the scenario has not passed successfully, determining that the subsequent execution of the scenario has failed due to a non-functional error;
determining that the non-functional error is based on a failure to locate a user interface element specified in the master frame; and
performing a recovery strategy, using the first captured user interface information and the second captured user interface information, to automatically locate the user interface element.

2. The method of claim 1, further comprising performing, during the subsequent execution of the scenario, an action on the located user interface element.

3. The method of claim 1, further comprising updating the master frame based on the second captured user interface information.

4. The method of claim 1, wherein the recovery strategy is a tree localization strategy that comprises automatically locating the user interface element in the second captured user interface information at a same relative position as a corresponding user interface element in the first captured user interface information.

5. The method of claim 1, wherein the recovery strategy is a multiple attribute strategy that comprises locating the user interface element by determining that the user interface element is a closest match for same-attribute values to a corresponding user interface element in the first captured user interface information.

6. The method of claim 1, wherein the recover strategy is a visual positioning strategy that comprises locating the user interface element by determining that the user interface element is at a same visual position in the second captured user interface information as a corresponding user interface element in the first captured user interface information.

7. The method of claim 6, further comprising creating an artificial intelligence model and using the artificial intelligence model to automatically identify different types of user interface elements.

8. The method of claim 1, wherein the scenario is based on a scenario description document written in a human-readable language.

9. The method of claim 8, wherein the master frame maps user interface elements and associated actions in the scenario description document to the first captured user interface information.

10. The method of claim 1, wherein the first captured user interface information includes document object model properties and screen coordinates of user interface elements of the application.

11. A system comprising:
one or more computers; and
a computer-readable medium coupled to the one or more computers having instructions stored thereon which, when executed by the one or more computers, cause the one or more computers to perform operations comprising:
accessing master frame information for a user interface of an application, the master frame information including first captured user interface information captured during a first execution of a scenario for the application;
performing a subsequent execution of the scenario, including capturing second captured user interface information;
determining that the subsequent execution of the scenario has not passed successfully;
in response to determining that the subsequent execution of the scenario has not passed successfully, determining that the subsequent execution of the scenario has failed due to a non-functional error;
determining that the non-functional error is based on a failure to locate a user interface element specified in the master frame; and
performing a recovery strategy, using the first captured user interface information and the second captured user interface information, to automatically locate the user interface element.

12. The system of claim 11, wherein the operations further comprise performing, during the subsequent execution of the scenario, an action on the located user interface element.

13. The system of claim 11, wherein the operations further comprise updating the master frame based on the second captured user interface information.

14. The system of claim 11, wherein the recovery strategy is a tree localization strategy that comprises automatically locating the user interface element in the second captured user interface information at a same relative position as a corresponding user interface element in the first captured user interface information.

15. The system of claim 11, wherein the recovery strategy is a multiple attribute strategy that comprises locating the user interface element by determining that the user interface element is a closest match for same-attribute values to a corresponding user interface element in the first captured user interface information.

16. A computer program product encoded on a non-transitory storage medium, the product comprising non-transitory, computer readable instructions for causing one or more processors to perform operations comprising:
accessing master frame information for a user interface of an application, the master frame information including first captured user interface information captured during a first execution of a scenario for the application;
performing a subsequent execution of the scenario, including capturing second captured user interface information;
determining that the subsequent execution of the scenario has not passed successfully;
in response to determining that the subsequent execution of the scenario has not passed successfully, determining that the subsequent execution of the scenario has failed due to a non-functional error;
determining that the non-functional error is based on a failure to locate a user interface element specified in the master frame; and
performing a recovery strategy, using the first captured user interface information and the second captured user interface information, to automatically locate the user interface element.

17. The computer program product of claim 16, wherein the operations further comprise performing, during the subsequent execution of the scenario, an action on the located user interface element.

18. The computer program product of claim 16, wherein the operations further comprise updating the master frame based on the second captured user interface information.

19. The computer program product of claim 16, wherein the recovery strategy is a tree localization strategy that comprises automatically locating the user interface element in the second captured user interface information at a same relative position as a corresponding user interface element in the first captured user interface information.

20. The computer program product of claim 16, wherein the recovery strategy is a multiple attribute strategy that comprises locating the user interface element by determining that the user interface element is a closest match for same-attribute values to a corresponding user interface element in the first captured user interface information.

* * * * *